(12) United States Patent
Dufour et al.

(10) Patent No.: US 6,212,377 B1
(45) Date of Patent: Apr. 3, 2001

(54) SYSTEM AND METHOD OF PROVIDING GROUP WIRELESS EXTENSION PHONE SERVICE IN A RADIO TELECOMMUNICATIONS NETWORK

(76) Inventors: Daniel Dufour, 62, 43e Avenue Est, Blainville, Quebec (CA), J7C 3M7; Eric Turcotte, 460 Abelart #1B, Verdun, Quebec (CA), H3E 1B5

( * ) Notice: Subject to any disclaimer, the term of this patent is extended or adjusted under 35 U.S.C. 154(b) by 0 days.

(21) Appl. No.: 08/753,699

(22) Filed: Nov. 27, 1996

(51) Int. Cl.[7] ................................ H04Q 7/24; H04Q 7/28
(52) U.S. Cl. .................... 455/426; 455/433; 455/462; 455/554; 455/557
(58) Field of Search .................... 455/426, 433, 455/462, 463, 465, 551, 554, 555, 557, 435, 436

(56) References Cited

U.S. PATENT DOCUMENTS

| | | | |
|---|---|---|---|
| 4,677,653 | * 6/1987 | Weiner et al. | 455/551 |
| 4,979,207 | * 12/1990 | Baum et al. | 379/112 |
| 5,054,042 | * 10/1991 | Soury et al. | 455/557 |
| 5,099,511 | * 3/1992 | Matsumoto | 379/198 |
| 5,189,695 | * 2/1993 | Maei | 379/199 |
| 5,291,549 | * 3/1994 | Izumi | 379/233 |
| 5,357,558 | * 10/1994 | Yoshikawa | 455/463 |
| 5,544,223 | 8/1996 | Robbins et al. | 455/426 |
| 5,610,969 | * 3/1997 | McHenry et al. | 455/435 |
| 5,621,783 | * 4/1997 | Lantto et al. | 455/433 |
| 5,771,275 | * 6/1998 | Brunner et al. | 455/436 |

FOREIGN PATENT DOCUMENTS

| | | |
|---|---|---|
| 2293524 | 3/1996 | (GB) . |
| WO 95/29565 | 11/1995 | (WO) . |

* cited by examiner

Primary Examiner—Willis R. Wolfe
(74) Attorney, Agent, or Firm—Griggs, Robinson, Post, Henderson & Smith, L.L.P.

(57) ABSTRACT

A radio telecommunications network for providing group extension phone service to a plurality of subscribers utilizing standard wireline telephones is disclosed. The network comprises a gateway mobile switching center (G-MSC) connected to an external communication network, a home location register (HLR) which includes a database of directory number (DN) categories, a serving mobile switching center/visited location register (MSC/VLR) which includes a plurality of cellular trunks in a pool configuration, a base station connected to the serving MSC/VLR, and a multi-line terminal (MLT) for connecting the plurality of standard wireline telephones to the base station. The MLT includes a cellular side for establishing a radio link to the base station, an office side for establishing wireline connections to the plurality of standard wireline telephones, and an interface between the cellular side and the office side.

16 Claims, 4 Drawing Sheets

SYSTEM AND METHOD OF PROVIDING GROUP WIRELESS EXTENSION PHONE SERVICE IN A RADIO TELECOMMUNICATIONS NETWORK

BACKGROUND OF THE INVENTION

1. Technical Field of the Invention

This invention relates to radio telecommunication systems and, more particularly, to a system and method of providing network support in a radio telecommunications network for a group of office extension phones.

2. Description of Related Art

For telecommunication system operators, investments in the local loop (the final connection from the local exchange to the subscriber's premises) represent a very large percentage of their costs, typically around 50 percent, due to the extensive and labor-intensive civil engineering work involved. The local loop also represents a large portion of operational costs because maintenance and repair in this part of the network are costly and time-consuming.

The local loop is of increasingly strategic importance to operators as a means of controlling the delivery of service to subscribers and because of its impact on operators' costs. At the same time, the size of the investment required for competing operators to match the capabilities of an incumbent operator means that introducing real competition in the local loop poses considerable problems. However, new fibre-based solutions, flexible multiplexers, compact remote concentrators, and new solutions for telecommunication services over cable-TV networks are examples of technologies now used by operators to build more effective access networks. The benefits of such technologies, however, have been slow to appear in the local loop. A system and method for providing the final connection from the local exchange to the subscriber's premises more rapidly and in a more cost-effective manner are needed.

Although there are no known prior art teachings of a solution to the aforementioned deficiency and shortcoming such as that disclosed herein, U.S. Pat. No. 5,054,042 to Soury et al. (Soury) discusses subject matter that bears some relation to matters discussed herein. Soury discloses a device for setting up and routing telephone calls between subscribers of a radio telephone network and/or a wired telephone network. Soury utilizes an automatic telephone exchange which is wired to the wired telephone exchange and connected to the radio telephone network by a plurality of radio transceivers via a radio connecting unit. The radio connecting unit enables an organization of the radio telephone subscribers into groups communicating on a same frequency and/or on a same transmission channel.

FIG. 1 of Soury, however, shows on the mobile subscriber side of the automatic telephone exchange that a given transceiver can only be connected to a unique mobile subscriber terminal. It would be advantageous to have a system in which, for greater sing efficiency, a single transceiver can be connected to a plurality of mobile terminals. In this manner, a group of transceivers can be utilized as a pool of resources to serve a greater number of mobile terminals. In addition, it would be desirable to have a radio network implementation that enables calls to be delivered to appropriate extension numbers. Such a solution would provide the final connection from the local exchange to the subscriber's premises more rapidly and in a more cost-effective manner. The present invention provides such a system and method.

Review of each of the foregoing references reveals no disclosure or suggestion of a system or method such as that described and claimed herein.

SUMMARY OF INVENTION

In one aspect, the present invention is a radio telecommunications network for providing group extension phone service to a plurality of subscribers utilizing standard wireline telephones. The network comprises a gateway mobile switching center (G-MSC) connected to an external communication network, a home location register (HLR) which includes a database of directory number (DN) categories, a serving mobile switching center/visited location register (MSC/VLR) which includes a plurality of cellular trunks in a pool configuration, a base station connected to the serving MSC/VLR, and a multi-line terminal (MLT) for connecting the plurality of standard wireline telephones to the base station. The MLT may include a cellular side for establishing a radio link to the base station, an office side for establishing wireline connections to the plurality of standard wireline telephones, and means for interfacing the cellular side with the office side.

In another aspect, the present invention is a radio telecommunications network for providing group extension phone service to a plurality of subscribers utilizing standard wireline telephones. The network includes a serving mobile switching center/visited location register (MSC/VLR) providing radio telecommunication services to the plurality of subscribers, a gateway mobile switching center (G-MSC) connected to an external communication network, and a home location register (HLR) connected to the G-MSC and the MSC/VLR. Also connected to the serving MSC/VLR is a first database which associates a dialed DN having a fixed private branch exchange (PBX) category with a mobile identification number (MIN), associates a plurality of cellular trunks with the MIN, and identifies which of the plurality of cellular trunks are idle. The network also includes a base station connected to the serving MSC/VLR, and a multi-line terminal (MLT) identified by the MIN, the MLT providing a radio link from the plurality of standard wireline telephones to the base station.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
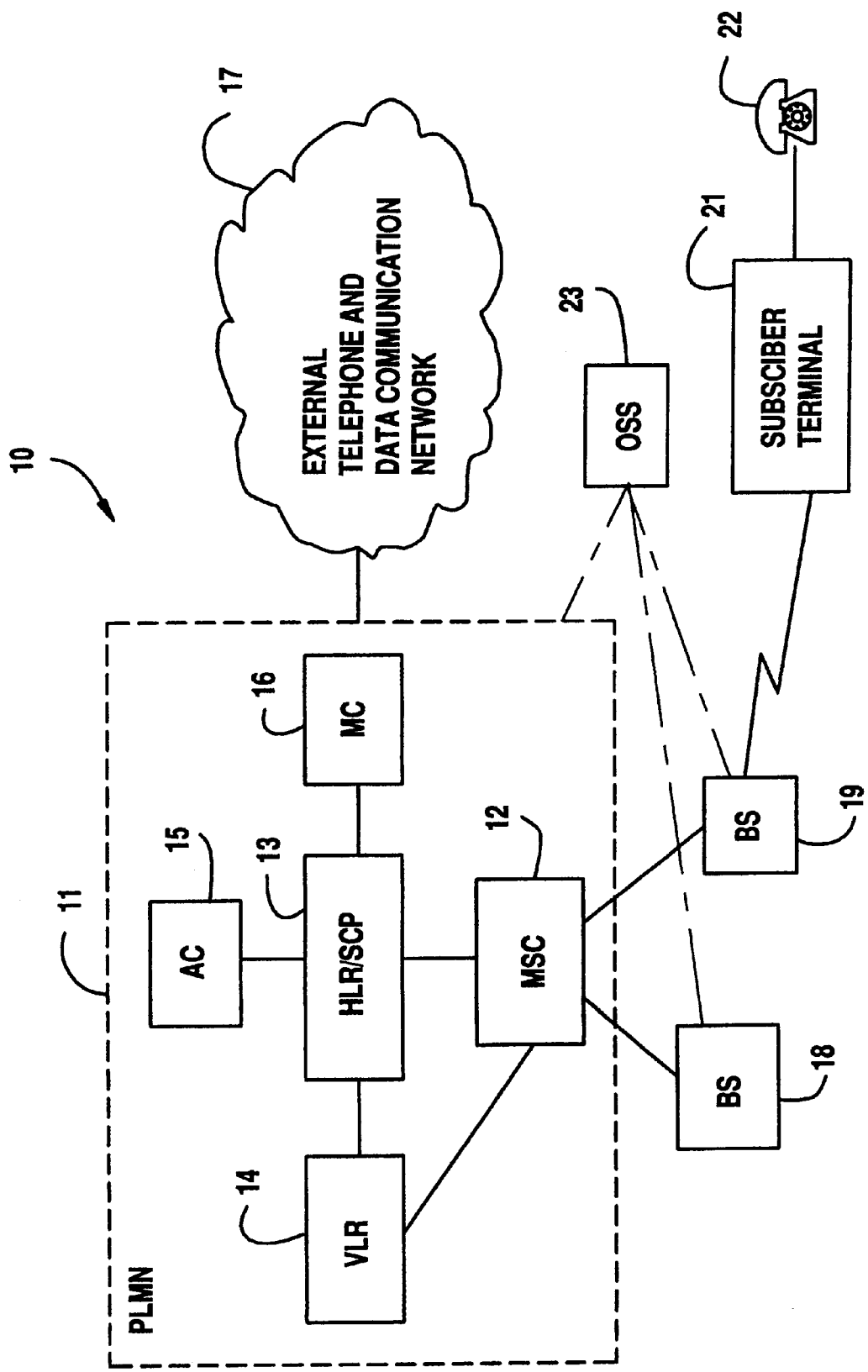
FIG. 1 is a simplified block diagram of one embodiment of a fixed cellular system of the present invention.

The present invention utilizes wireless technologies instead of traditional copper wire to provide the final connection from the local exchange to the subscriber's premises more rapidly and in a more cost-effective manner. Utilizing wireless technologies instead of traditional copper wire offers a number of benefits to the network operator in several respects:

(1) Deployment of wireless systems is more cost-effective. Once the initial wireless coverage has been established, the size of a network can be matched precisely to demand, allowing the operator to expand the network in line with subscriber growth, thus reducing the up-front investment. Additional transmitting and receiving equipment may be added to a base station in order to serve a larger number of subscribers. Additionally, adding more base stations to create more cells increases capacity, and in dense traffic areas, implementation of microcells provides both extended capacity and improved coverage. The cost of building a radio system, which requires considerably less civil engineering, is in many cases lower than the cost of building the wired equivalent.

(2) Operation and maintenance costs for radio systems are relatively low. There are no wires in the ground that can be accidentally cut off, or poles that break during storms, etc. One of the basic characteristics of the radio part of a wireless system is that it serves simultaneously as a trunk, a multiplexer, and a concentrator of traffic.

(3) Wireless systems can be rapidly deployed. A complete cellular system may be installed in a few months, and service can start as soon as the first radio base station is installed and connected to a switch (e.g., a mobile switching center (MSC) or local exchange (LE)). Wireless systems provide high capacity and wide area coverage. By means of digital technology and features such as hierarchical cell structures (HCS), wideband frequency hopping, and adaptive channel allocation (ACA), the capacity is greatly increased. Therefore, wireless systems are not only an application for rural areas, but may also be a cost-effective solution for urban areas.

(4) Wireless systems have often proved to be very reliable in the case of natural disasters, such as earthquakes and hurricanes. Even in the case of failures, the mean time to restoration is much shorter than that required for traditional copper-wired networks.

(5) Wireless systems also provide redundancy—a failure in one channel at a radio base station will only reduce capacity (or increase blocking), but no subscribers will lose their service.

A wireless access system may be implemented in two different ways: radio in the local loop (RLL) and fixed cellular systems. The decision to choose RLL or fixed cellular varies, depending on specific circumstances in each individual case. Several factors affect this decision:

(1) Spectrum allocation. This is a key issue for all operators who are considering wireless solutions;

(2) Whether the operator is or expects to be allowed to provide mobile service. This consideration is especially important not only to a new, competing operator but also to the traditional system operator who often has both mobile and fixed operations, and thus needs to consider which is the most cost-effective solution for certain parts of his service area;

(3) Whether the operator has specific service obligations imposed by regulatory/licensing conditions. For example, the license may require that the operator provide a certain number of lines in a short time, or that a specific number of lines be provided to rural areas in exchange for a license in the more profitable industrialized urban areas;

(4) Whether the operator can get leverage from, or has investments in, a fixed network or some other type of infrastructure;

(5) Whether the operator is new or incumbent;

(6) Potential subscriber base and penetration;

(7) The type of area or combinations of areas to be served (i.e., urban/suburban/rural);

(8) What service level the operator is planning to offer (e.g., basic/advanced POTS, ISDN, mobile, etc.); and (9) What kind of end-customers the operator will address (e.g., residential, small/large business, etc.).

An RLL system replaces the copper wire between a local exchange and the subscriber premises. It can be connected to any manufacturer's local exchange (LE) through a standard interface, e.g., two-wire, channel-associated signaling (CAS) or the ETSI standard V5.1 or V5.2. An RLL system is transparent to the services offered by the LE, depending on the capabilities of the RLL system selected. Standard telephone sets are used on the subscriber side.

On the other hand, a fixed cellular system is a complete cellular system including MSCs, radio base stations, intelligent network (IN) nodes, etc. In addition, it is provided with a subscriber terminal interface allowing standard telephone equipment to be connected. The services offered are the same as those of a corresponding mobile cellular system, which typically includes a number of advanced services as shown in Table 1 below.

TABLE 1

FIXED CELLULAR SERVICES

| Basic Services | Intelligent Network Services | Optional Features |
| --- | --- | --- |
| Call Waiting | Business Groups | Calling Number Identity |
| Call Transfer | Flexible Call Forwarding | Voice Mail With Notification |
| Three-Party Service | Outgoing Call Restriction | Priority Access |
| Data and Fax (9.6 kbit/s) | Incoming Call Acceptance | Alphanumeric Messaging |
| Do Not Disturb | Selective Call Rejection | Cellular Digital Packet Data (CDPD) |
| | Private Numbering Plan | Location-Based Charging |

In the fixed cellular network of the present invention, radio transmission takes the place of wires, connecting the subscribers to the network. The system may have the same architecture as that of ordinary mobile networks and may utilize the same type of equipment. The subscribers, however, are connected to the network with ordinary two-wire terminals, equipped with a radio interface. The mobility of the subscribers may be limited to a single cell or cell sector.

For the operator, the key benefit of a fixed cellular system is its ability to offer both fixed and mobile services in the same network. Using the cellular system as a base when providing fixed service offers the operator a high degree of flexibility. Through the use of exchange data, the present invention is able to differentiate between a mobile and a fixed subscriber, allowing both types of subscribers to coexist within the same system at the same time. An existing mobile network can be expanded with fixed subscribers, which will increase the use of the installed infrastructure. And, conversely, a cellular system providing fixed service can be supplemented with mobile subscribers.

In existing mobile networks, the peak usage hours for mobile subscribers are different from those of fixed subscribers. Mobile subscribers' usage tends to peak in the morning and early evening (commuting time), while fixed usage tends to be higher during the day (for business users) and in the evening (for residential users). By combining fixed and mobile terminals in a "mixed cellular" network, the operator can achieve optimal utilization of a mobile network since the addition of fixed cellular subscribers levels the load on the network. If so desired, mobile-originated calls, which generate higher revenues, can be given priority over fixed cellular calls at peak hours. In cases where fixed rural subscriber service is provided, the resulting increased coverage for mobile subscribers will in turn make the mobile service offering more attractive.

The present invention also supports implementations which offer subscribers varying degrees of mobility that fall somewhere between purely fixed and purely mobile applications. System operators may set the degree of mobility through system parameters on an individual subscriber basis, thereby restricting the mobility of designated subscribers to a single cell or several cells in the network. In addition, by utilizing different charging schemes based on location, the operator can create subscriptions with a lower calling rate in specified "home" cells and a higher rate whenever the subscriber initiates or receives a call outside the home area.

Fixed-cellular functionality is based on the concept of subscription areas. A subscriber to a fixed-cellular service only has access to it if he is located within his own subscription area (which may consist of one or more cells) and, consequently, the subscriber normally cannot make or receive calls in cells that are not part of his subscription area. The fixed cellular system enables a system operator to define a wide range of profiles of location-based services and tailor his service offerings to the subscribers needs. For example, the operator may activate a flnction that releases a call in progress if the subscriber moves outside his subscription area. If desired, the operator may allow the subscriber to have access to the short-message service (SMS) when located outside the subscription area, or the operator may allow the subscriber to make calls outside the subscription area, but at a higher rate. A cellular telecommunication system which implements a fixed subscription area (FSA) and a method of restricting an on-going call of a fixed subscriber to the FSA are disclosed in co-pending and co-owned U.S. patent application Ser. No. 08/430,831 filed on Apr. 28, 1995 entitled, "System and Method for Implementing Fixed Subscription Areas in a Cellular Radio Telecommunications Network", now abandoned.

When a subscriber is located at the boundary between two cells, it is often difficult to determine which cell the subscriber is in. This difficulty is due, in part, to the uncertainty of radio wave propagation predictions and may be overcome by the present invention in two ways. First, more than one cell with similar signal strength may be assigned to each subscriber in a boundary area. Second, if a subscriber accesses a cell that is outside its subscription area, the system determines whether any neighboring cell belongs to the subscription area. If so, the system orders the subscriber's telephone to make a "directed retry" to access the cell within the subscription area.

The fixed cellular system of the present invention supports the standard range of Public Switched Telephone Network PSTN) voice, data and fax services as well as value-added services such as voice-mail, e-mail, fax, alphanumeric messaging and IN services. This extensive set of services increases the revenue potential for the system operator.

The fixed cellular system may be implemented utilizing existing telecommunications standards. In North America, for example, the fixed cellular system may be implemented as a digital cellular system according to the IS-54 or IS-136 D-AMPS standards. For areas utilizing both the 800 MHz and 1900 MHz frequency bands, the fixed cellular system may be implemented in accordance with IS-136. IS-136 rev. A also includes an enhanced full-rate speech coder which has been shown to provide improved speech quality for cellular systems. Both IS-54 and IS-136 are hereby incorporated by reference herein.

Major Components of the Fixed Cellular System

FIG. 1 is a simplified block diagram of one embodiment of a fixed cellular system 10 of the present invention. Within the Public Land Mobile Network (PLMN) 11, the standard nodes of a cellular telecommunications network are located. These nodes include a mobile switching center (MSC) 12, a home location register which may be integrated with a service control point (HLR/SCP) 13, a visitor location register (VLR) 14, an authentication center (AC) 15, and a message center (MC) 16. The PLMN 11 may connect to external telephone and data communication networks 17. The MSC 12 is connected to base stations 18 and 19 which provide the radio interface with a subscriber terminal 21. The subscriber terminal provides a connection and interface for a standard telephone set 22. A cellular operation and support system (OSS) 23 provides support for overall system management, operation, and engineering.

In the fixed cellular system, as in mobile cellular networks, the telephony switching functions for the network are performed by mobile switching centers (MSCs). Each MSC handles calls to and from other telephone and data communication systems such as the Public Switched Telephone Network (PSTN), Integrated Services Digital Network (ISDN), Public Land Mobile Network (LMN), public data networks, and various private networks. Intersystem signaling between MSCs may be conducted, for example, according to the communications protocol IS-41. IS-41 also enables international roaming between different AMPS/D-AMPS operators, and is hereby incorporated by reference herein.

The HLR 13 contains data about all subscribers, their services and locations. In large networks with higher subscriber density, the HLRs are normally implemented as separate nodes. In small networks, the HLR may be functionally integrated into the MSC. The HLR may also be integrated with a service control point (SCP) providing IN services. The VLR 14 is a database containing all temporary subscriber information necessary for a visited MSC (V-MSC) to serve visiting subscribers.

The AC 15 provides authentication and encryption parameters that verify the user's identify and ensure the confidentiality of each call. Besides protecting against eavesdropping of conversation, this functionality also protects network operators from different types of fraud found in the cellular industry today. The MC 16 supports numerous types of message service such as, for example, voice mail, fax mail, e-mail, and alphanumeric messaging. The base stations 18 and 19 each contain the radio equipment needed for radio communication with the subscriber terminals in a cell. In order to increase capacity, a cell can be divided into several sectors.

In today's cellular systems, most subscribers use mobile hand-held terminals. Table 2 below shows that cells with more than 10 km radius can be obtained in these cases. But it also shows that if the system is designed only for fixed services, the coverage can be quite significantly increased.

TABLE 2

FIXED CELLULAR MAXIMUM CELL RADII (KM)

|  | Small City | Small City | Suburban | Suburban | Open Area |
|---|---|---|---|---|---|
| BS Antenna Height (m) | 30 | 50 | 50 | 50 | 100 |
| BS Antenna Gain (dBi) | 20 | 20 | 20 | 20 | 20 |
| Terminal Antenna Height (m) | 1.5 | 1.5 | 1.5 | 5.0 | 5.0 |
| Terminal Antenna Gain (dBi) | 0 | 0 | 0 | 6 | 6 |
| Max Cell Radius (km) | 7 | 9 | 18 | 36 | >50 |

In favorable cases, cells with up to 90 km radius can be achieved if the fixed cellular terminals are equipped with directional antennas mounted a few meters above the ground. A terminal output power of 0.6 W has been assumed. It is also assumed that the uplink is the limiting link due to lower power in the terminals than in the base stations.

In order to allow ordinary PSTN equipment to be used in a fixed cellular system, the system may operate with two different types of subscriber interface terminals 21—a Single-Line Terminal (SLT) 31 and a Multi-Line Terminal (MLT) 41. The terminals provide the radio connection to the base stations and sockets for subscriber telephone sets.

Figure 2:
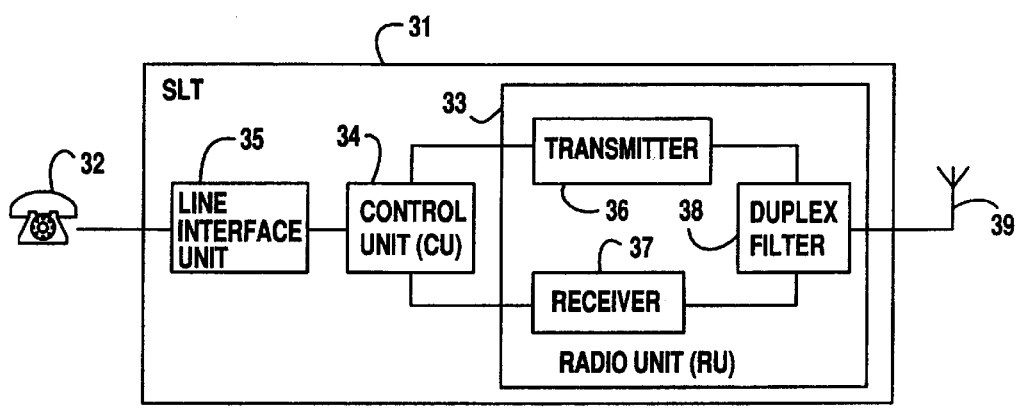
FIG. 2 is a simplified block diagram of a Single-Line Terminal which may be utilized to interface a standard telephone set with a cellular network.

FIG. 2 is a simplified block diagram of a SLT 31 which may be utilized to interface a standard PSTN telephone set 32 with a cellular network. The SLT 31 is the equivalent of one PSTN telephone line. Up to five telephones, all sharing the same telephone number, can be connected to one SLT. Fax machines and data modems can also be connected to the SLT. It may be powered by a standard AC/DC adapter (not shown) connected to an ordinary wall socket. It may also be equipped with an optional battery power backup unit, which supplies power in case of a main power failure.

The SLT 31 includes a radio unit (RU) 33, a control unit (CU) 34, and a line interface unit 35. The radio unit 33 includes a transmitter 36, a receiver 37, and a duplex filter 38. The duplex filter 38 makes it possible to use a single antenna 39 for simultaneous transmission and reception. The radio unit supports dual-mode operation under the IS-54 and IS-136 standards. The control unit 34 decodes and manages information transmitted over the air interface as well as information to and from the line interface unit 35. The line interface unit 35 provides a two-wire interface to the standard PSTN telephone set 32. The line interface unit may be programmed to emulate different national PSTN standards for ringing tones, dialing tones, line voltage, etc.

Figure 3:
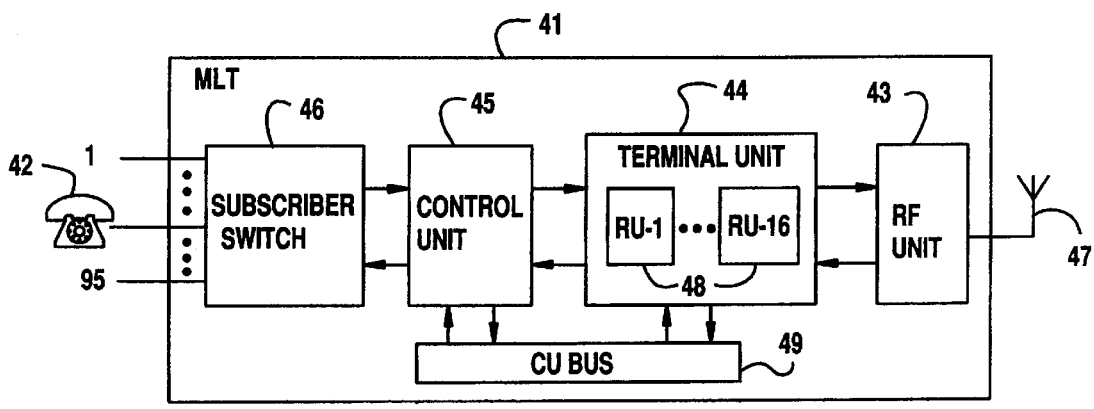
FIG. 3 is a simplified block diagram of a Multi-Line Terminal which may be utilized to interface a plurality of standard telephone sets with a cellular network.

FIG. 3 is a simplified block diagram of a Multi-Line Terminal (NET) 41 which may be utilized to interface a plurality of standard telephone sets 42 with a cellular network. The MLT 41 includes an RF unit 43, a terminal unit 44, a control unit 45, and a subscriber switch 46. The RF unit 43 controls the antenna 47 and the antenna interface. The terminal unit 44 includes a plurality of radio units 48 (also referred to as "cellular trunks") similar to the radio unit 33 in the SLT 31, needed for communication with the cellular system. A maximum of sixteen (16) radio units 48 may be provided in the terminal unit 44. The control unit 45 contains all logic for signalling between the different units in the MLT 41. The control unit 45 also handles tasks such as radio channel allocation and calling number transfer. A CU bus 49 provides data transfer between the control unit 45 and the terminal unit 44. The subscriber switch 46 provides an interface to the subscriber lines 42.

The MLT 41 enables more efficient use of radio transmission equipment on the subscriber side. This allows a more cost effective solution in cases where groups of subscribers are located close to each other. Up to 95 users may be trunked together onto the 16 radio units 48 in the MLT. Each of these 95 users has a unique identity in the fixed cellular network and may be treated as an individual subscriber.

The MLT 41 may be utilized in an urban setting, for example, to connect different telephones in an office or apartment complex through one common MLT to a cellular network. In a rural setting, one or several MLTs may be utilized to connect the telephones in a small village to a cellular network.

Functionally, the MLT 41 has a cellular side and an office/PBX side. The cellular side has a cellular interface and is capable of transmitting and receiving on multiple cellular trunks. An incoming cellular call may be routed to any office-side line or an operator. The MLT 41 may include a separate cellular trunk line for each office telephone 42, or there may be a greater number of office telephones. For example, the MLT may have 16 incoming/outgoing cellular tunks and 95 office telephones. A portion of the cellular trunks, such as 5 lines, may be allocated to a manual or electronic operator. For operations utilizing the Analog Control Channel, 5 mobile identification numbers (is) are assigned to the operator. A limitation with this embodiment is that when the operator forwards a call to an extension, the cellular trunk to the operator remains busy. Thus, once 5 calls are connected through the operator, no more calls can get through to the operator.

The preferred solution to this problem is an MLT in which all 16 cellular trunks are associated with a pool of 16 different MINs. Each trunk may have multiple MINs assigned to it. With this embodiment, incoming calls to the MLT from the cellular network always go to the operator on the office/PBX side. If a direct line to a subscriber is desired, a cellular trunk is reserved for the direct lines so that the V-MSC knows that the direct line is busy.

Outgoing calls from the office side may be handled in the following manner. The PBX automatically notifies the cellular side when an office telephone goes off-hook. The cellular side then automatically originates a call to a dummy roamer port number which is recognized by the cellular network. The dummy number provides access to a voice channel, and a dial tone is provided to the office/PBX side through the cellular side when a voice channel is seized. As the subscriber dials the digits of the called telephone number, the dialed digits are buffered in the office/PBX. The PBX has a dial tone detector, and when the dial tone is detected, the PBX knows that a voice channel has been seized, and the buffered digits are sent.

In addition to the SLT and the MLT, any cellular phone complying with the IS-54/IS-136 standards may be utilized in a D-AMPS fixed cellular system. These phones can be used to offer subscribers cordless service, but with a wider coverage than that of an ordinary cordless telephone. Geographically-based charging may be offered. For example, a low-charge may apply for service for cordless calls initiated in the cells that cover the subscriber's office, whereas a medium or high charge may apply to calls from other cells.

Fixed Cellular Operations on an Analog Control Channel

Figure 4:
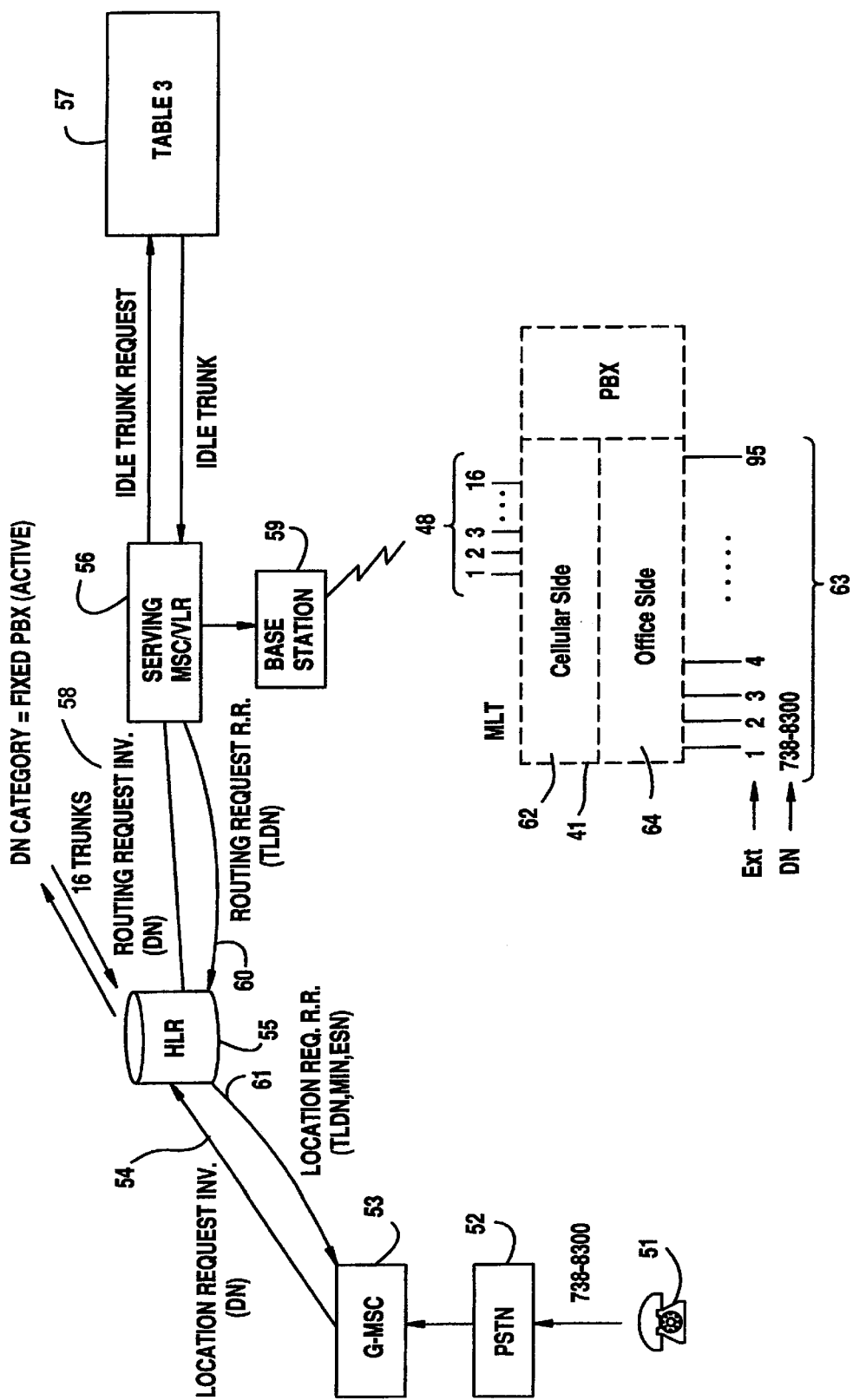
FIG. 4 is a high level block diagram of a portion of a cellular radio telecommunications network which supports a fixed cellular installation utilizing an analog control channel (ACC) in accordance with the teachings of the present invention.

FIG. 4 is a high level block diagram of a portion of a cellular radio telecommunication network which supports a fixed cellular installation utilizing an Analog Control Channel (ACC) in accordance with the teachings of the present invention. A subscriber 51 within the PSTN 52 dials a Directory Number (DN), for example 738-8300, which identifies the MLT 41. The call is routed to a Gateway MSC (G-MSC) 53 which sends a routing inquiry (e.g. Location Request Invoke message in IS-41) 54 to a Home Location Register (HLR) 55. The HLR then sends a routing request invoke message 58 to the serving MSC/VLR 56. In the scenario depicted in FIG. 4, the serving MSC/VLR 56 has acquired, in a previous registration event, the category "fixed PBX" associated with the MLT identified by the received DN. Upon receiving the routing request message, the serving MSC/VLR accesses its database, which may be represented by a table such as Table 3 below, to determine which of the cellular trunks are busy and which are idle. Table 3 may show, for example, that trunk #4 is idle. If no trunks are idle, the serving MSC/VLR 56 sends a routing request return result message to the HLR 55 and includes an indication that call delivery has failed. If, however, an idle bunk is available, the serving MSC/VLR 56 selects the idle trunk, pages the selected trunk, and establishes a voice channel through the base station 59 to the paged trunk, by using the MIN associated with the selected trunk. The serving MSC/VLR 56 also marks this trunk as busy.

Concurrent with the paging and establishment of a voice channel, the serving MSC/VLR 56 allocates a Temporary Location Directory Number (TLDN) to the selected idle trunk and returns the TLDN to the HLR 55 in a routing request return result message 60. The HLR 55 then sends a location request return result message 61 to the G-MSC 53 and includes the allocated TLDN and the selected MIN together with the ESN associated with that MIN, for the selected idle trunk.

The MLT 41 (FIG. 3) may be utilized to provide an office PBX with a wireless cellular side 62 and a plurality of standard wireline telephones 63 on an office side 64. The control unit 45 (FIG. 3) provides an interface between the cellular side and the office side. In one embodiment, the office side telephones are accessed through the MLT 41 through a single telephone number associated with a dedicated operator line. An electronic or manual operator then transfers calls to individual extension numbers internally within the MLT 41.

For example, when a call comes to the HLR 55 for the accessing DN (e.g. 738-8300), the HLR 55 checks the call category and determines that this number is for a PBX unit. The unit may be equipped with a plurality of incoming and outgoing cell trunks 48 (FIG. 3). In FIG. 4, the MLT 41 is equipped with incoming and outgoing cell trunks. The serving MSC/VLR 56 checks whether each trunk is idle or busy, and then pages and connects the call on an idle trunk, if available.

When the MLT 41 receives a page message including a MIN that corresponds to one of its associated MINs, the MLT 41 verifies that one of its radio units 48 (FIG. 3) is idle and sends a page response back to the base station 59, which forwards it to the serving MSC/VLR 56. The call is then delivered from the G-MSC 53 to the serving MSC/VLR 56 utilizing normal call delivery procedures.

TABLE 3

| MIN | MLT Cellular Trunk Number | Trunk Status | Directory Number (DN) |
|---|---|---|---|
| MIN$_1$ | 1 | Idle | 738-8300 |
| MIN$_2$ | 2 | Busy | |
| MIN$_3$ | 3 | Idle | |
| MIN$_4$ | 4 | Idle | |
| MIN$_5$ | 5 | Busy | |
| ... | ... | ... | ... |
| MIN$_{16}$ | 16 | Idle | |

Fixed Cellular Operation on a Digital Control Channel

Figure 5:
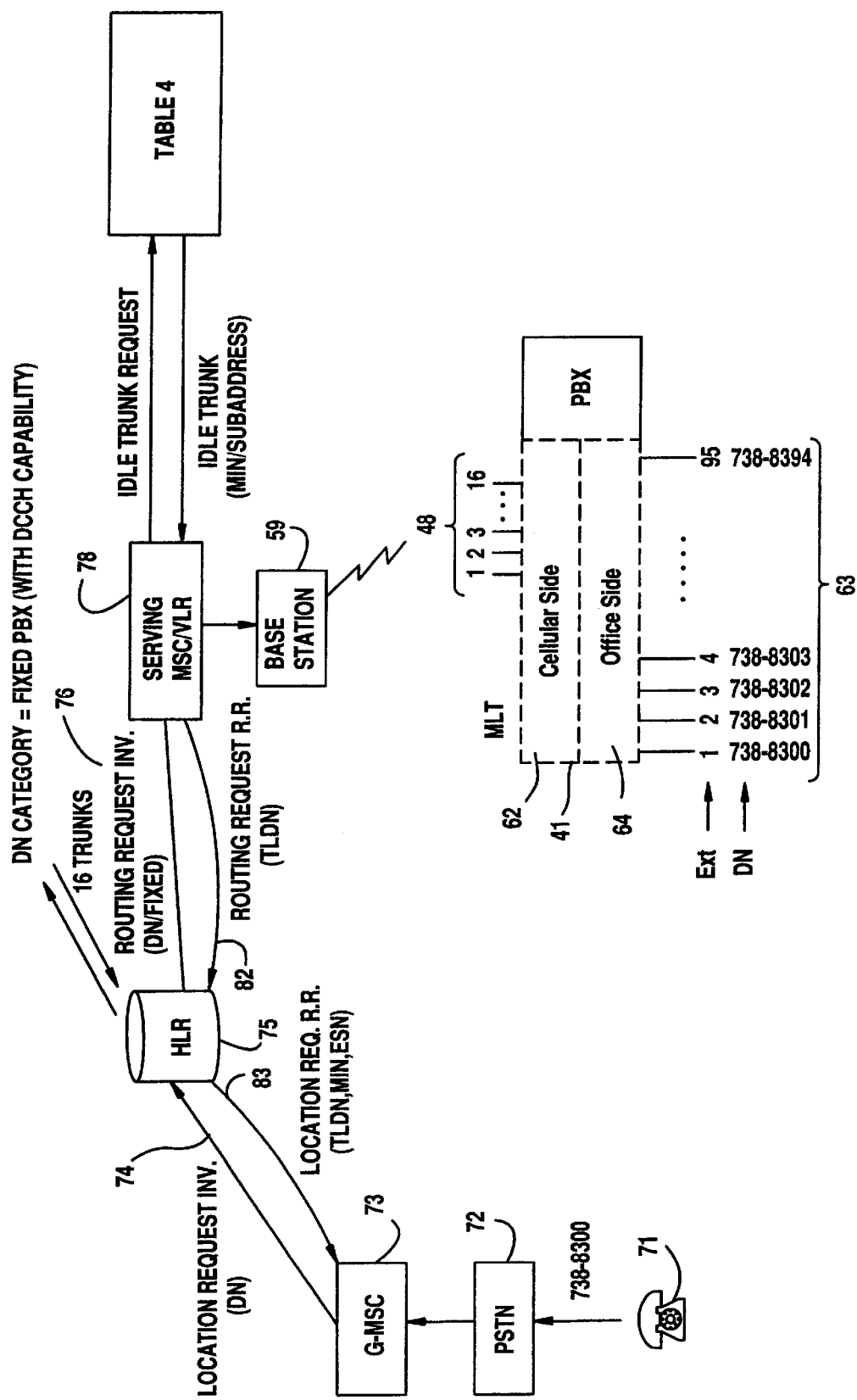
FIG. 5 is a high level block diagram of a portion of a cellular radio telecommunications network which supports a fixed cellular installation utilizing a digital control channel (DCCH) in accordance with the teachings of the present invention.

FIG. 5 is a high level block diagram of a portion of a cellular radio telecommunications network which supports a fixed cellular installation with direct lines utilizing a Digital Control Channel (DCCH) in accordance with the teachings of the present invention. In a first example, a subscriber 71 within the PSTN 72 dials a Directory Number (DN), for example, 738-8300, which is associated with a fixed operator in the MLT 41. When the call is received at the G-MSC 73, a routing inquiry (e.g.,Location Request Invoke message in IS-41) 74 is sent from the G-MSC 73 to the HLR 75 to determine the location and status of the called mobile station. Upon receiving the routing inquiry 74, the HLR 75 sends a routing request invoke message 76 to the serving MSC/VLR 78 and includes the DN.

In the scenario depicted in FIG. 5, the serving MSC/VLR 78 has acquired, in a previous registration event, the category "fixed PBX" associated with the MLT identified by the received DN. Upon receiving the routing request message, the serving MSC/VLR accesses its database, which may be represented by a table such as Table 4 below, to determine which of the cellular trunks are busy and which are idle. Table 4 may show, for example, that trunks #1 and #3 are busy, and trunks #2 and #4 are idle.

TABLE 4

| MIN | Subaddress | MLT Cellular Trunk No. | Trunk Status | Director Number (DN) |
|---|---|---|---|---|
| MIN$_1$ | None | 1 | Busy | Operator -> 738-8300 |
| | | 3 | Busy | |
| | | 2 | Idle | |
| | | 4 | Idle | |
| | 100 | 5 | Busy | Private Line -> 738-8301 |
| | 110 | 6 | Idle | Private Line -> 738-8302 |
| | 200 | | | Private Line -> 738-8303 |
| | 210 | | | Private Line -> 738-8304 |
| | 500 | 7 | Idle | Private Line -> 738-8305 |
| | 503 | 8 | Busy | Private Line -> 738-8306 |
| | 505 | | | Private Line -> 738-8307 |
| | 510 | | | Private Line -> 738-8308 |
| | 520 | | | Private Line -> 738-8309 |
| | 360 | 9 | Busy | Private Line -> 738-8310 |
| | 205 | 10 | Busy | Private Line -> 738-8311 |
| ... | ... | ... | ... | ... |
| | 950 | 16 | Idle | Private Line -> 738-8392 |
| | 951 | | | Private Line -> 738-8393 |
| | 952 | | | Private Line -> 738-8394 |

If no trunks are idle, the serving MSC/VLR 78 sends a routing request return result message to the HLR 75 and includes an indication that call delivery has failed. If one of the trunks associated with that DN is idle, the serving MSC/VLR 78 selects one of them, and then pages and establishes a voice channel through the base station 59 to the selected trunk, by using that selected MIN$_1$ associated with that MLT 41. The serving MSC/VLR 78 also mark this trunk as busy.

Alternatively, the serving MSC/VLR 78 may check the status of all sixteen trunks 48 associated with that MLT 41 (i.e., trunks #1 through #16). If one of the MLT trucks is idle, the serving MSC/VLR 78 proceeds to page the MLT 41 using MINI associated with that MLT 41.

In a second example, the subscriber 71 within the PSTN 72 dials a Directory Number (DN), for example, 738-8301, which is associated with a private line (i.e., identified by MIN=$MIN_1$ and subaddress=100) in the MLT 41. When the call is received at the G-MSC 73, a routing inquiry (e.g., Location Request Invoke message in IS-41) 74 is sent from the G-MSC 73 to the HLR 75 to determine the location and status of the called mobile station. Upon receiving the routing inquiry 74, the HLR 75 sends a routing request message 76 to the serving MSC/VLR 78 and includes the DN.

In the scenario depicted in FIG. 5, the serving MSC/VLR 78 has acquired, in a previous registration event, the category "fixed PBX" associated with the MLT identified by the received DN. Upon receiving the routing request message, the serving MSC/VLR accesses its database, which may be represented by a table such as Table 4 above, to determine which of the cellular trunks are busy and which are idle. Table 4 may show, for example, that trunk #5 is busy and trunk #6 is idle (see Table 4). If no trunks are idle, the serving MSC/VLR 78 sends a routing request return result message to the HLR 75 and includes an indication that call delivery has failed. If one of the trunks associated with that DN is idle, the serving MSC/VLR 78 selects one of them, pages the selected trunk, and establishes a voice channel through the base station 59 to the paged selected trunk, by using the selected MIJ associated with the MLT 41, together with the subaddress associated with the private line identified by the DN. The serving MSC/VLR 56 also marks this trunk as busy. The IS-136 DCCH air interface standard allows for subaddressing when paging, and the extension number corresponds to the subaddress information included in the appropriate call delivery messages of the DCCH.

Alternatively, the serving MSC/VLR 78 may check the status of all sixteen trunks 48 associated with the MLT 41 (i.e., trunks #1 through #16). If one of the MLT trunks is idle, the serving MSC proceeds to page the MLT 41 using $MIN_1$ associated with the MLT 41 and subaddress 100 associated with the 738-8301 line.

Concurrent with the paging and establishment of a voice channel, the serving MSC/VLR 78 allocates a Temporary Location Directory Number (TLDN) to the selected idle trunk and returns the TLDN to the HLR 75 in a routing request return result message 82. The HLR 75 then sends a location request result message 83 to the G-MSC 73 and includes the allocated TLDN and the selected MIN together with the ESN associated to that MIN, for the selected idle trunk.

The MLT 41 includes a cellular side 62 and an office side 64. In FIG. 5, the cellular side 62 is equipped with 16 incoming and outgoing cell trunks 48. The cellular side 62 responds to paging in accordance with IS-136 or other applicable standard, and when the call is set up from the serving MSC/VLR 78, the office side 64 connects the call to the called extension 63.

It is thus believed that the operation and construction of the present invention will be apparent from the foregoing description. While the method, apparatus and system shown and described have been characterized as being preferred, it will be readily apparent that various changes and modifications could be made therein without departing from the spirit and scope of the invention as defined in the following claims.

What is claimed is:

1. A system in a radio telecommunications network for connecting a subscriber utilizing a standard wireline telephone to said radio telecommunications network, said system comprising:

a mobile switching center/visited location register (MSC/VLR) in said radio telecommunications network, said MSC/VLR serving a geographic area in which said subscriber is located;

a subscriber terminal for interfacing said standard wireline telephone with said radio telecommunications network; and a base station connected to said serving MSC/VLR for providing a radio link between said radio telecommunications network and said subscriber terminal.

2. The system of claim 1 wherein said subscriber terminal is a single line terminal (SLT) comprising:

a line interface unit connected to said standard wireline telephone;

a control unit connected to said line interface unit, said control unit managing information transmitted and received by said SLT; and a radio unit connected to said control unit, said radio unit transmitting and receiving information between said SLT and said radio telecommunications network.

3. A system in a radio telecommunications network for providing group extension phone service to a plurality of subscribers utilizing standard wireline telephones, said system comprising:

a mobile switching center/visited location register (MSC/VLR) in said radio telecommunications network, said MSC/VLR serving a geographic area in which said plurality of subscribers are located;

a subscriber terminal for interfacing said plurality of standard wireline telephones with said radio telecommunications network; and a base station connected to said serving MSC/VLR for providing a radio link between said radio telecommunications network and said subscriber terminal.

4. The system of claim 3 wherein said subscriber terminal is a multi-line terminal (MLT), said MLT comprising:

a subscriber switch connected to said plurality of standard wireline telephones;

a control unit connected to said subscriber switch;

a terminal unit connected to said control unit, said terminal unit including a plurality of radio units for transmitting and receiving information between said MLT and said radio telecommunications network;

a radio frequency (RF) unit for controlling an antenna and an antenna interface; and a data bus for transferring data between said control unit and said terminal unit.

5. A radio telecommunications network for providing group extension phone service to a plurality of subscribers utilizing standard wireline telephones, said network comprising:

a gateway mobile switching center (G-MSC) connected to an external communication network;

a home location register (HLR) connected to said G-MSC, said HLR including a database of directory number (DN) categories;

a serving mobile switching center/visited location register (MSC/VLR) connected to said HLR, said serving MSC/VLR including a plurality of cellular trunks in a pool configuration;

a base station connected to said serving MSC/VLR; and a multi-line terminal (MLT) for connecting said plurality of standard wireline telephones to said base station.

6. The radio telecommunications network of claim 5 wherein said MLT includes:

a cellular side for establishing a radio link to said base station;

an office side for establishing wireline connections to said plurality of standard wireline telephones; and means for interfacing said cellular side with said office side.

7. The radio telecommnunications network of claim 6 wherein said MLT is associated with a plurality of mobile identification numbers (MINs), and said serving MSC/VLR includes means for associating each of said cellular turns in said pool configuration with any one of said plurality of MINs associated with said MLT.

8. The radio telecommunications network of claim 7 wherein said serving MSC/VLR includes:

means for determining which of said plurality of cellular trunks is idle; and means for paging and establishing a voice channel on a selected idle cellular trunks.

9. The radio telecommunications network of claim 8 wherein said serving MSC/VLR includes means for associating a dialed directory number with said selected idle cellular trunk.

10. The radio telecommunications network of claim 9 wherein said MLT includes means for routing an incoming call through an operator to any of said plurality of standard wireline telephones.

11. A radio telecommunications network for providing group extension phone service to a plurality of subscribers utilizing standard wireline telephones, said network having a serving mobile switching center/visited location register (MSC/VLR) providing radio telecommunication services to said plurality of subscribers, said network comprising:

a gateway mobile switching center (G-MSC) connected to an external communication network;

a home location register (HLR) connected to said G-MSC and said MSC/VLR;

a first database connected to said serving MSC/VLR which associates a dialed directory number (DN) having a fixed private branch exchange (PBX) category with a mobile identification number (MIN), associates a plurality of cellular trunks with the MIN, and identifies which of said plurality of cellular trunks are idle;

a base station connected to said serving MSC/VLR; and a multi-line terminal (MLT) identified by said MIN, said MLT providing a radio link from said plurality of standard wireline telephones to said base station.

12. The radio telecommunications network of claim 11 wherein said MLT includes said plurality of cellular trunks for providing said radio link from said plurality of standard wireline telephones to said base station.

13. The radio telecommunications network of claim 12 wherein said serving MSC/VLR includes means for paging said MLT utilizing one of said MINs identify said MLT.

14. The radio telecommunications network of claim 13 wherein said means for paging said MLT utilizing one of said MINs identifying said MLT includes means for paging said MLT utilizing one of said MINs identifying said MLT and a subaddress identifying a specific one of said plurality of standard wireline telephones.

15. The radio telecommunications network of claim 12 wherein said MLT includes:

a cellular side which includes said plurality of cellular trunks for establishing said radio link to said base station;

an office side for establishing wireline connections to said plurality of standard wireline telephones; and means for interfacing said cellular side with said office side.

16. The radio telecommunications network of claim 15 wherein said MLT includes means for routing an incoming call through an operator to any of said plurality of standard wireline telephones.

* * * * *

UNITED STATES PATENT AND TRADEMARK OFFICE
CERTIFICATE OF CORRECTION

PATENT NO. : 6,212,377 B1
DATED : April 3, 2001
INVENTOR(S) : Daniel Dufour et al.

Page 1 of 1

It is certified that error appears in the above-identified patent and that said Letters Patent is hereby corrected as shown below:

Title page, column 1,
Item [76], Inventors, second address, delete "Abelart" and substitute -- Abelard -- therefor.
After Inventors, add -- [73] Assignee: Telefonaktiebolaget LM Ericsson (publ), Stockholm (SE).

Column 2,
Item [74], Attorney, Agent or Firm, delete "Griggs, Robinson, Post, Henderson & Smith, L.L.P." and substitute -- Smith, Danamraj & Youst, P.C. -- therefor.

Column 1,
Line 54, delete "sing" and substitute -- trunking -- therefor.

Column 5,
Line 35, delete "finction" and substitute -- function -- therefor.
Line 63, delete "PSTN)" and substitute -- (PSTN) -- therefor.

Column 7,
Line 54, delete "(NET)" and substitute -- (MLT) -- therefor.

Column 11,
Line 5, delete "MINI" and substitute -- $MIN_1$ -- therefor.
Line 31, delete "MIJ" and substitute -- $MIN_1$ -- therefor.

Signed and Sealed this

Thirteenth Day of November, 2001

*Attest:*

*Attesting Officer*

NICHOLAS P. GODICI
*Acting Director of the United States Patent and Trademark Office*